(12) United States Patent
Sisk (10) Patent No.: US 8,657,898 B2
(45) Date of Patent: Feb. 25, 2014

(54) AIR FILTER SPIN FLOW INLET/OUTLET HOUSING

(75) Inventor: David E. Sisk, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 160 days.

(21) Appl. No.: 13/200,235

(22) Filed: Sep. 22, 2011

(65) Prior Publication Data
US 2013/0074461 A1    Mar. 28, 2013

(51) Int. Cl.
*B01D 50/00* (2006.01)

(52) U.S. Cl.
USPC ............ 55/337; 55/456; 55/498; 55/459.1; 55/493; 55/503; 55/459.2; 55/459.3; 55/459.4; 96/380; 96/384; 96/385

(58) Field of Classification Search
USPC ............ 55/337, 456, 498, 459.1, 493, 503, 55/459.2, 459.3, 459.4; 96/380, 384–385
See application file for complete search history.

(56) References Cited

U.S. PATENT DOCUMENTS

| | | | |
|---|---|---|---|
| 2,897,005 A | 7/1959 | Wiltse | |
| 3,201,927 A | 8/1965 | Wachter | |
| 3,295,679 A | 1/1967 | Rosaen | |
| 3,300,050 A | 1/1967 | Perry | |
| 3,929,379 A | 12/1975 | Krambrock | |
| 4,207,883 A | 6/1980 | Shindler | |
| D261,501 S | 10/1981 | Schenker | |
| 4,316,522 A | 2/1982 | Hirschorn | |
| 4,632,682 A | 12/1986 | Erdmannsdorfer | |
| 4,818,398 A | 4/1989 | Lott et al. | |
| 4,871,455 A | 10/1989 | Terhune et al. | |
| 5,067,856 A | 11/1991 | Sisk | |
| 5,653,870 A | 8/1997 | Tsuchiya et al. | |
| 7,014,675 B2 * | 3/2006 | Nakai et al. | 55/429 |
| 7,520,925 B2 | 4/2009 | Sisk et al. | |
| 2003/0234137 A1 | 12/2003 | Buckner | |
| 2005/0178716 A1 | 8/2005 | Suri | |
| 2009/0100813 A1 * | 4/2009 | Iddings et al. | 55/489 |

* cited by examiner

*Primary Examiner* — Dung H Bui
(74) *Attorney, Agent, or Firm* — Paul M. Denk (57) ABSTRACT

An air filtration unit for conveying bulk granular material from a tank trailer, and uses air pressure to achieve granular flow, the air filtration unit incorporates an intake that induces a spiral flow, the unit incorporates a lid at the back end of the filter housing, and a baffle structure at the intake inlet of the unit, to dampen sound.

17 Claims, 8 Drawing Sheets

FIG. 13

AIR FILTER SPIN FLOW INLET/OUTLET HOUSING

CROSS REFERENCE TO RELATED APPLICATION

This non provisional patent application claims priority to the design patent application having Ser. No. 29/373,511, having filing date Apr. 18, 2011.

BACKGROUND OF THE INVENTION

Filter silencer units are often installed upon a tractor for a pneumatic operative tank trailer. This is a tank trailer which unloads its cargo under the influence of moving pressurized air, as when it arrives at the site of delivery.

Pipes or hopper tee's on railroad tank cars, tank trailers, pipelines, and other means for conveyance have been available for some time. The delivered product exits from the storage compartment of the transport carrier, such as its tank trailer, and then flows through piping upon the trailer for delivery by hose or further piping to a storage facility or location of usage. In dry bulk hauling, such as of pellets, powders, and grains, the seal integrity at the pipe connection is essential to prevent contamination of the material either to be hauled, or after hauling, such as in a tank trailer, and it is desirable to provide not only cleansed air that is used in the unloading process, but also to reduce the volume of noise involved in the discharge, when accomplished. The pellets or powders unloaded from the gravity gate valves or hoppers located on the bottom of the tank car, exit through tee's that are attached to the bottom of a hopper which normally connect with a collection of pipes, that convey air under pressure to assist in the unloading process. A vacuum or air stream from a pneumatic conveyor system created in the piping system accelerates the unloading of dry bulk products from a hopper. This is known in the art.

During the unloading process, the hopper of the tank trailer must be completely empty, and all of the dry bulk product removed, to prevent contamination of any later loads. In addition, not only must the unloading air pressure system be 100% effective in removing the transported cargo, but it is highly necessary that the air itself be reasonably purified, so as not to add any contamination to the discharging bulk granular material, during unloading. Any residue that remains may contaminate subsequent loads, or may generate any mold or other deleterious substance, that can contaminate subsequent loads, as aforesaid.

Presently, the bulk transporting industry favors downloading dry product from tank trailers by pneumatic systems. This can be seen in U.S. Pat. No. 7,520,925, for which the inventor of this current application was a co-inventor therein. A pneumatic system begins with a blower mounted to a tractor, often a truck. When turning at high revolutions per minute, the blower forces air into a discharge pipe that pressurizes the collection pipes below a trailer. The pressurized air then attracts by venturi flow the granular material, by gravity out of the tank trailer, and it is conveyed within the stream of the pressurized flowing air, to the site of storage. The pressurized air then delivers the dry bulk product from the collection pipes to the delivery point, commonly by way of a hose. As known, a typical blower generates much noise, and permits traces of oil, grease, and dirt to enter the discharge pipe. All of these are detrimental. As mentioned above, contamination remains of high concern to dry bulk haulers, particularly where the cargo may be subsequently used in food stuffs, or as ingredients therefore. During downloading of dry bulk products, contamination must be lowered, if not eliminated, in ordered to meet food safety standards. In addition, any noise levels generated during unloading must be lowered generally to conform with local noise ordinances.

Other examples of prior filtration or fluid conveying systems can be seen in the United States Patent to Wiltse, U.S. Pat. No. 2,897,005, that shows a fluidize pressure system.

The patent to Wachter, U.S. Pat. No. 3,201,927, discloses a closure device for a filter container. This filter container apparently is used as a gas cleaning filter, and has flow outwardly of the filter, rather than inwardly thereof.

The patent to Rosaen, U.S. Pat. No. 3,295,679, shows a bayonet fluid filtering assembly.

The patent to Perry, U.S. Pat. No. 3,300,050, shows another filter unit, in this instance, used in a fuel dispensing hose.

The patent to Krambrock, U.S. Pat. No. 3,929,379, shows a further method and apparatus for the pneumatic conveying of bulk material. This has been previously described in the background of the invention herein as to how the current invention is utilized for conveying bulk granular material from a tank trailer hopper.

U.S. Pat. No. 4,207,883, to Shindler, discloses a hood assembly with a noise filter.

The patent to Schenker, U.S. Des. 261,501, discloses a combined air muffler and filter.

The patent to Hirschorn, U.S. Pat. No. 4,316,522, discloses an acoustic filter silencer. This appears to be a rather elaborate filtration device for attenuating sound.

U.S. Pat. No. 4,632,682, to Erdmannsdorfer, discloses a cartridge type oil separator air filter.

The patent to Lott, et al, U.S. Pat. No. 4,818,398, discloses a further filter system with readily replaceable filter element.

The patent to Terhune, et al, U.S. Pat. No. 4,871,455, further discloses a filter assembly with lockable lug means.

A further patent to Sisk, U.S. Pat. No. 5,067,856, discloses an inline air filter for dry bulk tank trailers. This is similar to the filter means as described in the previous Sisk '925 patent, and is used in the discharge of bulk granular material from their conveying vehicle.

The patent to Tsuchiya, et al, U.S. Pat. No. 5,653,870, discloses another filter system.

The published application to Buckner, No. U.S. 2003/0234137, shows a vacuum pump filter that has a silencer in combination therewith.

Finally, the published application to Suri, No. U.S. 2005/0178716, discloses a filter assembly with filter element incorporating an integral seal.

The present invention overcomes select limitations of the prior art, and in addition, adds supplemental improvements the efficiency of functioning of the air filtering system, in addition to damping the decibels of any generated sound, during its operations while unloading a tank trailer of its granular material.

FIELD OF INVENTION

This invention relates to an air filter spin flow inlet/outlet housing for filtering and silencing the entry of pressurized air into a bulk tank discharge system to provide effective and efficient operations of the unloading system during discharge of its load at the site of delivery.

SUMMARY OF THE INVENTION

The principal concept of the current invention is to provide a filtering unit that incorporates a housing in which an air filter locates, generally along the length of the housing, and in order to add to the efficiency of operations of the filtration device, the air intake into the housing is arranged to introduce air in a spiraling direction of flow in order to furnish a spin flow of the air around the filter, to provide for filtration of the air along the entire length of the arranged filter, and not have the filtration concentrated at any particular position along the length of the filter, as may occur with prior art devices. The inlet casting of the filtration device creates a spiraling airflow that utilizes more of the surface area of the located filter element, to assure that high efficiency filtration takes place, the incoming air is purified, so that no contamination can take place of the granular material being moved by the airflow, after it is filtered, and as it passes through the outline of the hopper car or tank trailer that is being unloaded.

Secondly, an additional feature of this improvement which greatly enhances its operations is the location of a silencer that is built into the air inlet casing, and has a resonating chamber or chambers that reduces the blower noise, but yet without constricting airflow, and therefore alleviates any concern regarding the violation of any anti-noise ordinances, that may be in place in any particular municipality in which the tank trailer is being unloaded, when arriving at its destination.

These two principal features of this invention greatly enhance the operations of the unloading device, for a tank trailer, or a hopper car, and are certainly an improvement over the types of filtration devices as generally disclosed in the prior art, even those that had been previously invented by the inventor of the current unit, as noted.

There are other accessories built into the structure of the air filter spin flow inlet/outlet and its housing of this invention, such as having an operative lid through which filters may be removed, cleaned, replaced, if ever required, and incorporating a single cam lever lid that is spring biased against the proximate end of the filter element, once it is installed within the housing of the noted unit. Furthermore, the housing of this unit is integrally cast, that incorporates a conveniently located outlet, where the filtered air passes out of the unit, on its way towards the unloading segments of the outlet line operatively associated with the tank trailer, etc.

In addition, an enhanced result of this invention is to have both the inlet, and the outlet, for the unit, located at the same end of the filter housing, to make it very convenient for connecting an incoming air line thereto, or the line from the air pump, and the outlet line for the pressurized and filtered air, as it passes along underneath of the tank trailer, or hopper car, while drawing the granular materials stored therein, for conveyance to another location for either usage or storage.

It is, therefore, the principal object of this invention to provide an air filter spin flow inlet/outlet housing for an air filtration device, that both effectively and highly efficiently cleanses the incoming air over the entire length and surface area of its associated and contained filter, and at the same time, furnishes a spiraling flow to the incoming air, to achieve that wide spread dissemination of the air over the entire length of the filter, during its air filtering operation.

Another aspect of this invention is the location of baffling means within the air inlet casting for the filtering unit, that effectively functions to substantially reduce the noise associated with the operations of any pneumatic air filtering and conveying device.

Another object of this invention is to provide an air inlet casting that has resonating chambers that reduce blower noise without constricting airflow during its functioning.

Still another object of this invention is to provide the inlet casting for the housing of a filtration unit that is contoured for causing a spiraling airflow that utilizes more surface area along the entire length of the filter element, during its filtering of the incoming air for use for conveying purpose during the unloading of grain or other granular material from a tank trailer, hopper car, or any related conveying vehicle.

Yet another object of the invention is to provide a spin flow filter system that has a silencer built into the air inlet casting for the filter unit.

Still another object of this invention is to provide an air filtering system where the introduction of air into its structure causes the air to spin as its passes through the air inlet on its way towards the filtration system to attain a cleansing of the air before it is applied into contact with the granular material being unloaded from a tank trailer.

Still another object of this invention is to provide a filtration unit that can be easily opened, through the operations of a single cam lever lid, for the purpose of inspecting, or removing a filter, either for its cleansing, or replacement.

Still another object of this invention is to provide a filtration unit that significantly reduces any clogging or soiling of its filter, by spiraling the incoming air around the outer surface of the contained filter, to assure that all aspects of the filter cooperate in the cleansing of the incoming air, and that filtration is not concentrated at a single end of the filter, such as where the air intake delivers air into the filter unit.

Yet another object of this invention is to provide a pneumatic air conveying air filter system, that has been proven to achieve in excess of 8% noise reduction over current air filters available on the market today.

Yet another object of this invention is to incorporate a baffle plate within the air inlet for a filtration unit in order to achieve sound deadening.

A further object of this invention is to provide an air inlet cast into the structure of an air filter, and which inlet is contoured so as to achieve a spiraling of the incoming air three hundred sixty degrees around the contained filter element in a non turbulent fashion, while effectively reducing noise, and avoiding any pressure drop thereat.

Still another object of this invention is to provide a lid for an air filtering housing which can be swung out the way, when it is desired to remove or replace the filter element contained within the air filtration structure.

Still another object of this invention is to provide a lid for a air filtering housing which can be swung out the way, when it is desired to remove or replace the filter element contained within the air filtration structure.

Still another object of this invention is to provide the location of an air filter within a pneumatic air filter housing which incorporates seating means that maintains the filter centrally within the housing so as to avoid any disruption in the flow of air spiraling around the filter during its incoming flow.

Yet another object of this invention is to provide an air filtering device that incorporates relatively fewer parts, but attains far more significantly beneficial results, than what is currently available upon the market.

These and other objects may become more apparent to those skilled in the art upon review of the summary of the invention as provided herein, and upon undertaking a study of the description of its preferred embodiment, in view of the drawings.

DESCRIPTION OF THE PREFERRED EMBODIMENT

Figures 1, 2, 3:
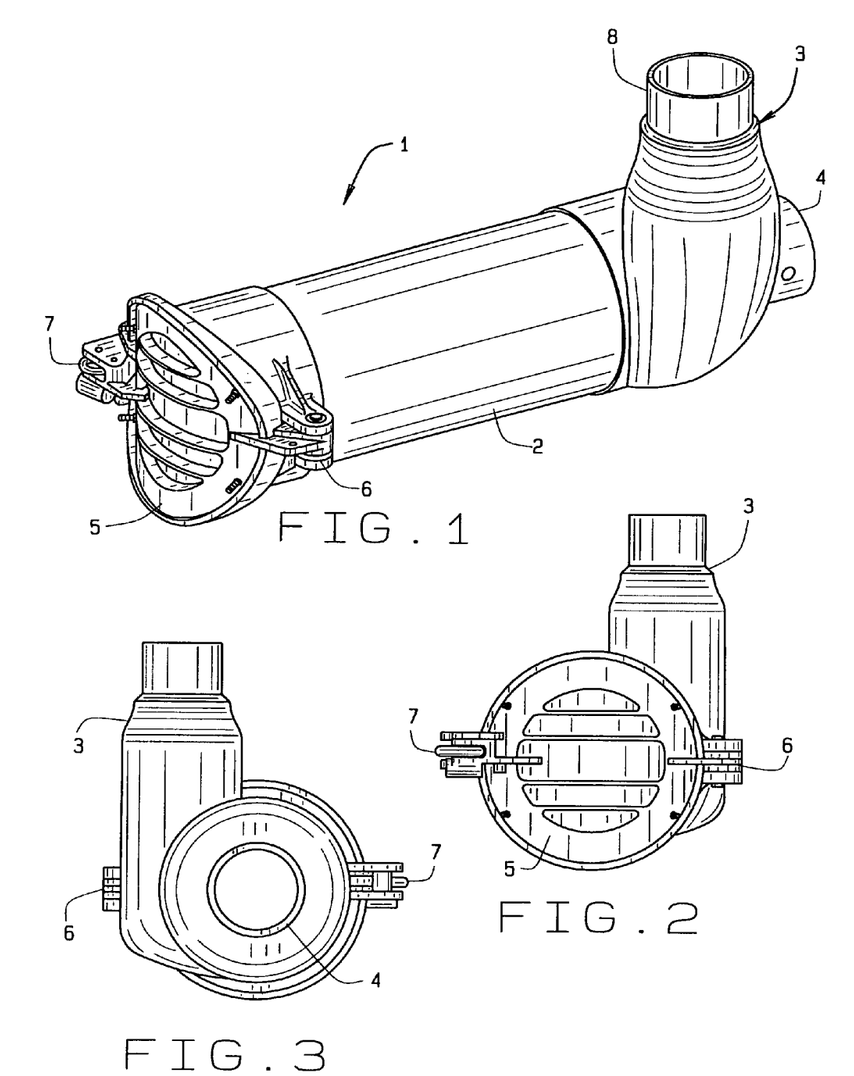
FIG. 1 is an isometric view of the air filter spin flow inlet/outlet housing for the air filtering device of this invention.
FIG. 2 is a back view thereof.
FIG. 3 is a front view.
Figure 4:
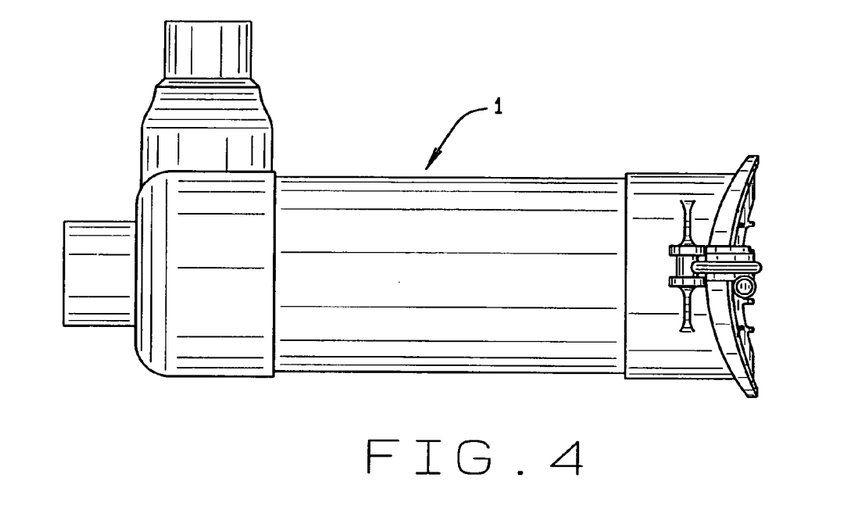
FIG. 4 is a right side view.
Figure 5:
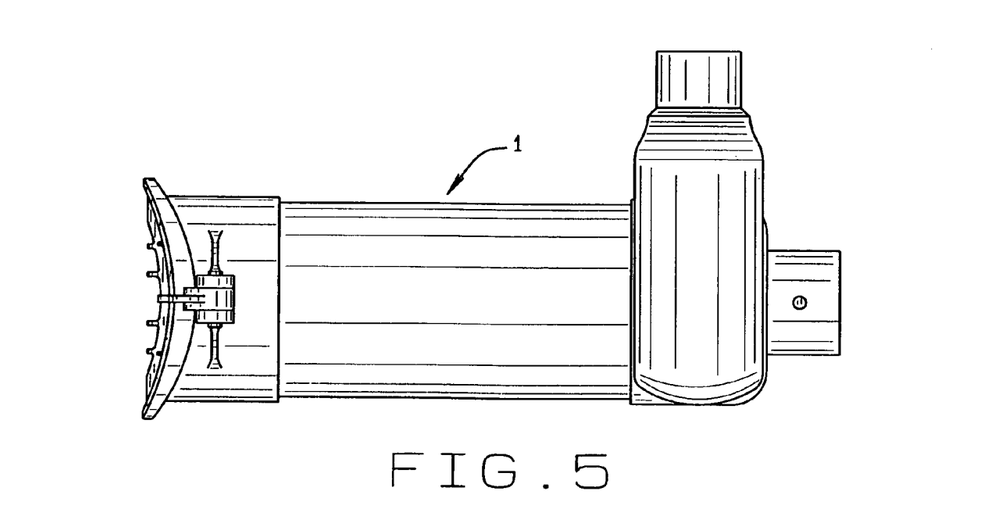
FIG. 5 is a left side view.
Figure 6:
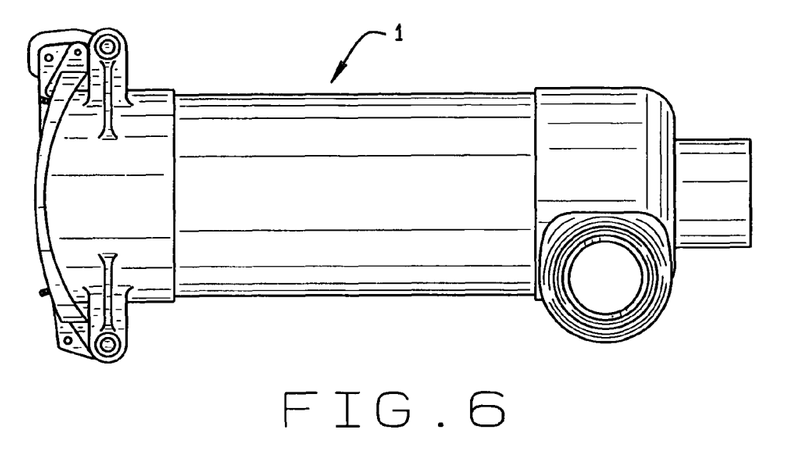
FIG. 6 is a top view.
Figure 7:
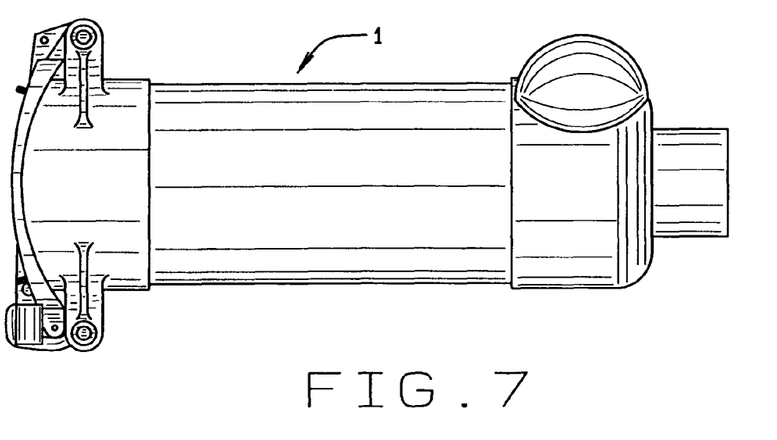
FIG. 7 is a bottom view.

In referring to the drawings, and in particular FIG. 1, the air filter spin flow inlet/outlet housing for the air filtering unit 1 of this invention is readily disclosed. It incorporates its housing 2 that has, at its front end, an air intake or inlet chamber 3 and in addition, provided longitudinally and axially centrally of the housing 2, and extending from the front end, is the air outlet 4 that directs the air through the outlet air line, that assist in the removal of the granular material from the tank trailer, or hopper car, or any other conveying vehicle, during its operations. At the back end of the housing 2 is the door 5 which pivotally connects by means of its pivotal connection, as at 6, proximate the back end of the housing, as can be noted. The door is held in position by means of a cam lever 7 that locks the door into its closed position, but can be easily unlatched, when it is desired to attain access into the housing, such as when it may be necessary to clean or replace the filter element (not shown) contained therein.

The rear door 5 can be more accurately seen in its back end view, as noted in FIG. 2, while the air outlet 4, and its relative diameter with respect to the housing can be seen in FIG. 3. It is also to be noted that both the air intake, as at 3, at its outlet 4, are both located at the front end of the filter unit 1, so that the air line (not shown) from the air pump can be directly connected onto the upper end of the intake, as at 8, and the outlet line for the tank trailer can be easily accommodated and fasten in place onto the air outlet 4, as can be noted.

Obviously, when the door 5 is locked into closure, after the filter has been located therein, it seals off the back end of the housing, so that all of the incoming intake air, as it swirls around the filter, will pass through the filter, and only obtain its exit from the filtration unit through the outlet 4, at the front end of the housing.

Other views of the filtration unit 1 can also be seen in FIGS. 4 through 7.

Figure 13:
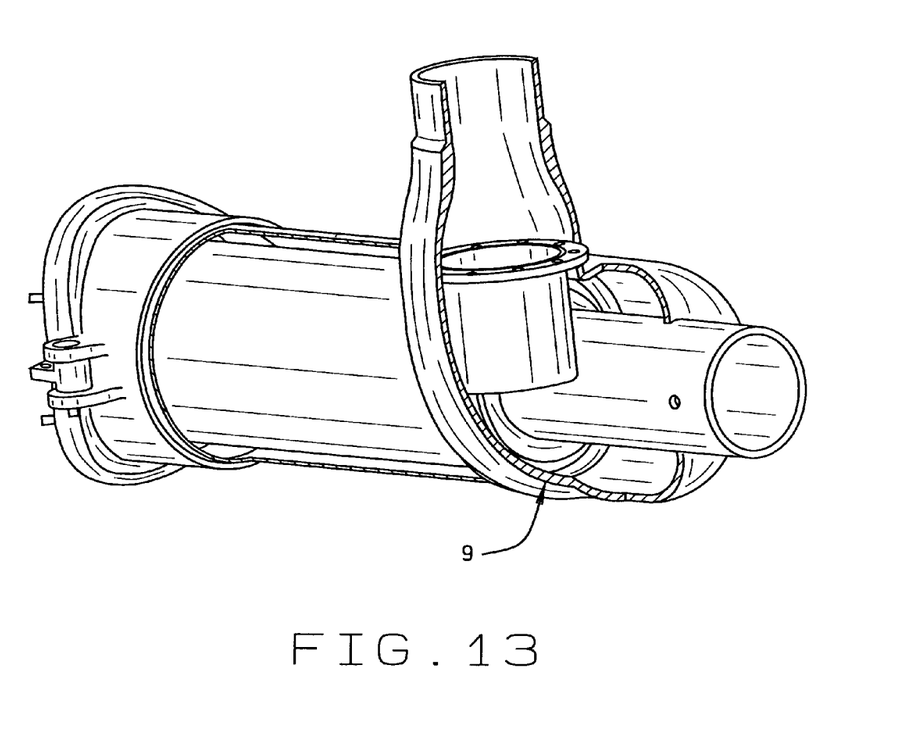
FIG. 13 shows a cutaway view of the contoured inlet to achieve swirling of air in the filter housing.

One of the unique features of the current invention is to provide a swirling of the incoming air, through the air inlet 3, into a spiraling pattern as it flows around the contained filter 8, provided within the housing 2. This can be achieved, as can be noted in FIG. 9, by providing a contour slope, as at 9, along the inner surface of the intake 3, so that when the air under pressure enters into the intake, as being conveyed from an air pump, it impinges upon the slope of the inner surface 9, and begins to under take a spiraling pattern of flow, as can be noted in FIG. 9, around the located filter 8, and thereby enters into the filter along its entire length, to provide for effective filtering of the incoming air, and not have the filtration of the air focused at any one isolated location, such as at the front end of the filter, which normally occurs when the incoming air has a direct flow into the housing, rather than through its swirling along the length of the filter, as induced and achieved through the usage of the current invention. See also FIG. 13 for the contoured slope 9 at the bottom of the intake line. Thus, more efficient filtration of the air can be achieved for a much more sustained period of time, which means that the filtering unit can be used for a much greater length of time, before the filter either needs to be cleaned, or replaced, as compared to devices currently upon the market.

Figure 9:
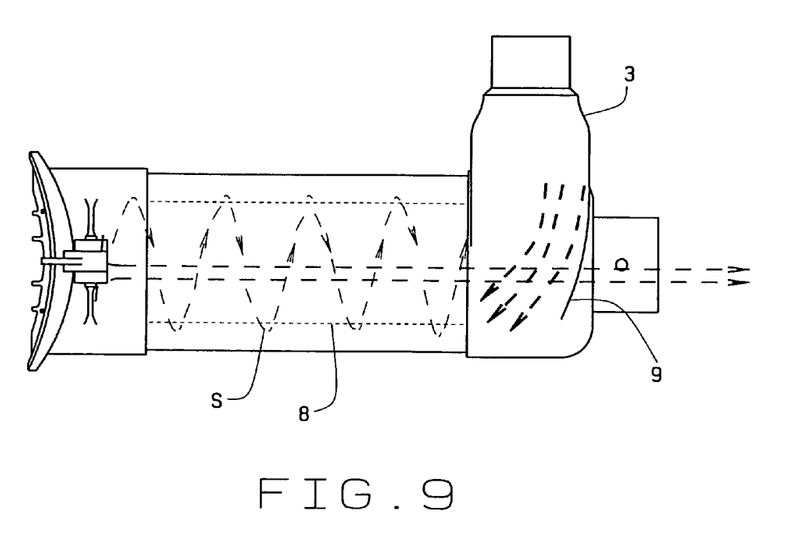
FIG. 9 is a schematic view showing the intake of air at the unit inlet, and discloses how the air spirals around the filter contained therein.
Figure 10:
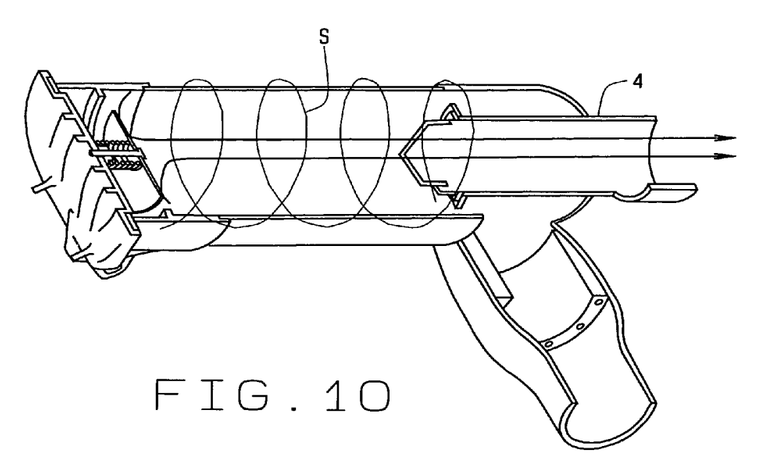
FIG. 10 shows how the spiraled air passes through the filter and exists the air outlet of the filtration unit.

The spiraling effect of the incoming air can be so clearly seen, schematically, as noted at S in the shown embodiments, such as in said FIGS. 9 and 10.

Figure 8:
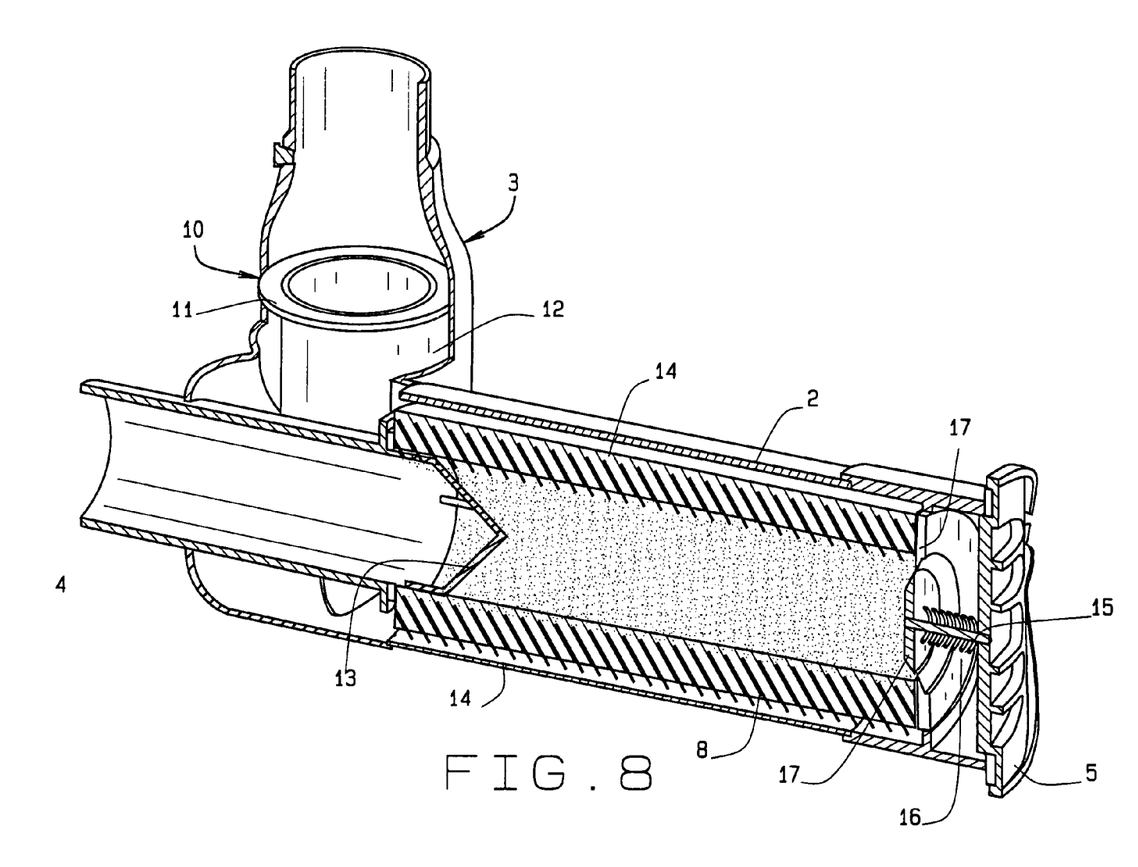
FIG. 8 is a longitudinal sectional view taken through the mid point along the length of the unit.

Obviously, the filter 8 of this invention can be of any type of filter that may be normally employed for use for air filtering purposes, it may be a pleated filter element, or it may be even of a strengthen fluted paper filter, or any other type of filter that can filter air down to one micron particles, to attain their separation from within the airflow, when cleansing the air for future conveyance purposes, as described for the operations of this invention. It may be possible that even a polymer type of filter, one made of poron, and which provides for fine filtration of miniscule particles, may also be used for the purposes of this invention. The filter as shown schematically in FIG. 8, is simply to identify the location of the filter, without reference to its usable structure. The filter may also be made of metal or other polymer or a combination of materials.

Another significant improvement provided within the structure of this air filtering unit can also be seen in FIG. 8. As there noted, a baffle plate 10 is mounted within the air intake 3, and the plate can be welded in place, or otherwise secure therein, and is provided for sound deadening purposes. Generally, the baffle has the effect of slightly disrupting the flow of the air, or forcing it further inwardly, and has been found to lessen the noise generated during operations of the unit, in combination with the air pump, to effectively silence the flowing air, and the noises accompanying its processing, by the efficiency as previously summarized herein. The baffle plate includes its ring-like member 11, which has secured to its inner edge the sleeve 12 that extends downwardly of the inlet of the contoured air intake, as can be noted, and functions in combination with the contoured surface 9, to help direct the air into a spiraling flow, in the manner as previously reviewed.

Other structural elements embodied within this unit include the outlet conduit 4, which does extend inwardly of the housing 2, or at least to its frontal edge, and has secured therewith a formed guide wire 13, that functions to seat the front end of the filter 8, when it is located within the housing, as can be noted in FIG. 8.

Likewise, and to position the filter centrally within the housing, leaves that air space 14 sufficiently uniform around the outer perimeter of the filter, within the outer wall of the housing 2, so that the swirling air may pass along the length of said space 14, and the backend of the housing cooperates with the door means 5, which has arranged internally thereof a pin mount 15 supporting a spring 16 which biases against a contoured plate 17 which both centers the filter in position axially within the housing, and biases against its back end thereof, so as to force any swirling air that reaches that vicinity to pass through the filter 8 of the unit to prevent any further reward movement, to attain filtration of the air by the unit during its operations.

Thus, as can be understood, the wire guide 13, in combination with the plate 17, fixes the filter in place, axially and longitudinally aligned within the housing 2 of the filtering unit 1.

Once the air is filtered by the unit, the air passes directly out of the outlet 4 as can be noted, for flow along the length of any outlet pipe that is connected thereto, where the air cooperates with the outlet tee at the bottom of any tank trailer hopper, or the like, to draw granular material out of the trailer, and to convey it along the length of the outlet conduit for delivery for usage or storage at the unloading site.

Figure 11:
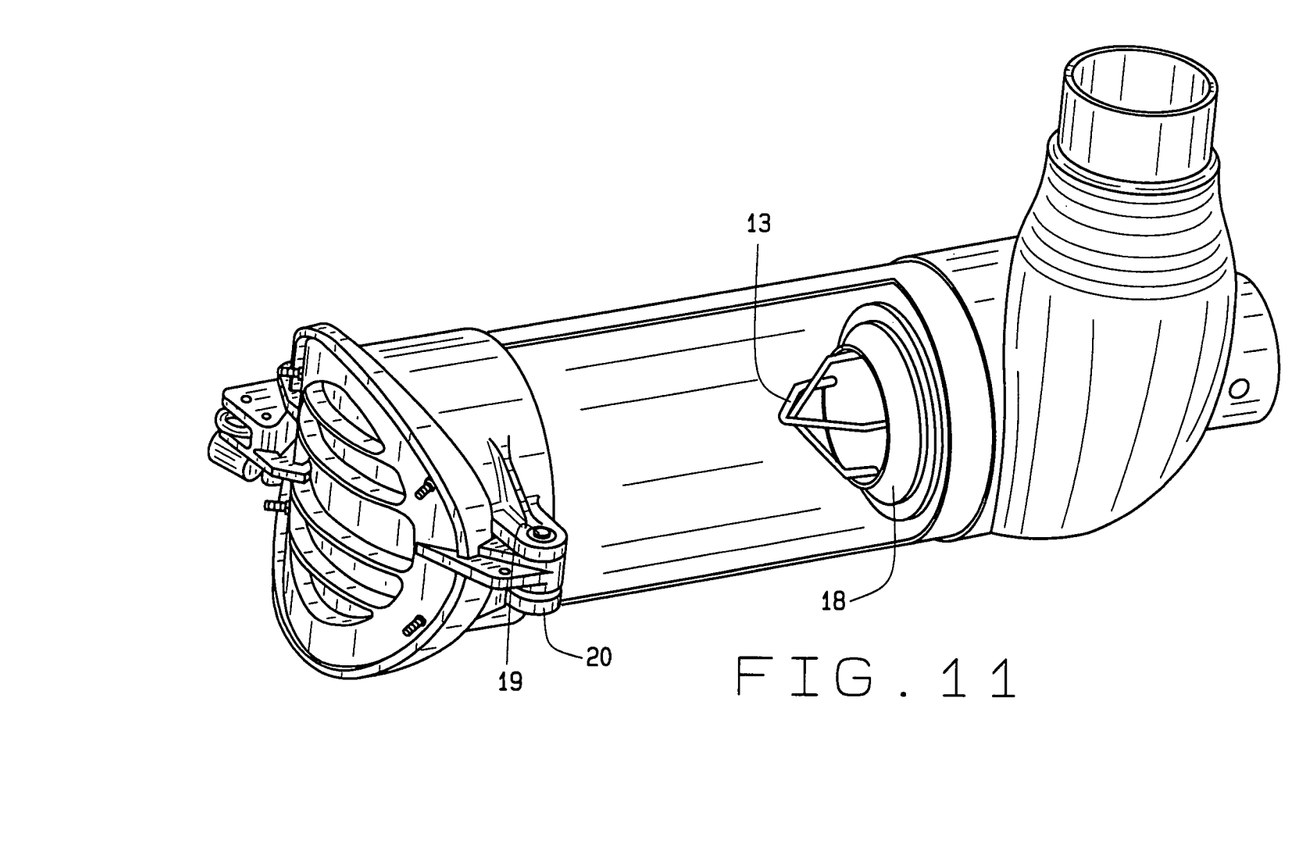
FIG. 11 provides an isometric view, partially broken away along the length of the housing, showing the filter seating means proximate the inlet and outlet end of the filter unit.

FIG. 11 shows a further view, partially broken away, of the air filtration unit, where the wire guide 13 can be seen, as centrally arranged, and furnishing a shoulder, as at 18, upon which the filter is seated.

Figure 12:
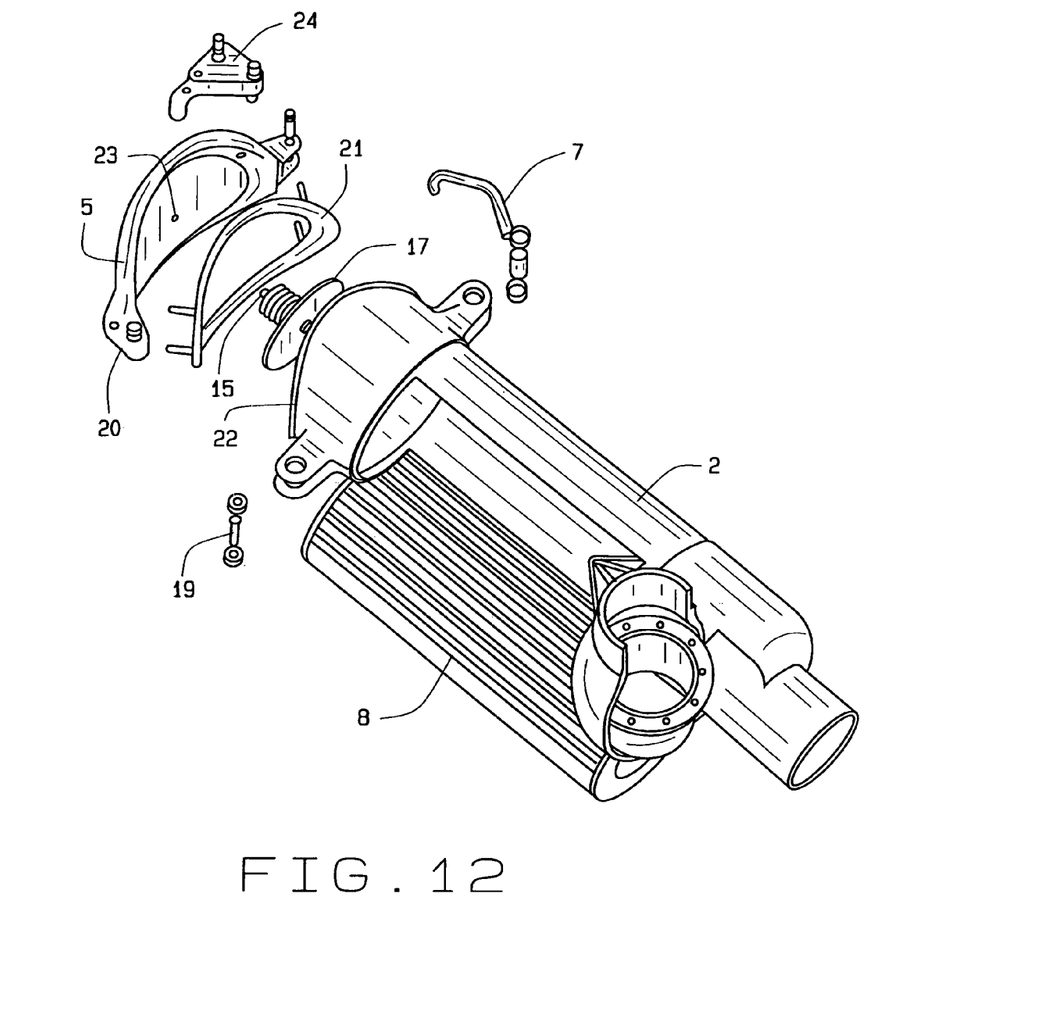
FIG. 12 provides an exploded view of the various components that are assembled into the air filter unit of this invention.

FIG. 12 provides an exploded view of the various components that make up the filtration unit of this invention. The exploded view is similar in schematic to that as disclosed in FIG. 11, where part of the housing 2 is removed to show the arrangement of the filter 8 as removed from the unit, for disclosure purposes. Normally, as previously explained, the housing 2 is a complete cylinder, and the filter will be applied through the opened back door 5 of the unit, when its unlatched lid or door is unlocked, by opening of the single cam lever 7 as can be noted. The door or lid 5 is held by the pivot 19 for pivotal movement about its latch 20, and the lid 5, along with the sealing gasket 21, biases against the back end 22 of the unit, to hold the spring biased plate 17 in position, pushing against the back of the installed filter 8, when the unit is assembled for operation. The shaft 15 locates within the aperture 23, to hold the plate centrally within position, when the lid 5 is closed. The cam lever 7, in combination with the pivotal cam locking mechanism 24 is what locks the lid 5 in place, during its closure. Any type of locking mechanism can be used therewithin.

As previously reviewed, the primary benefits of the concept of this invention is to provide for a spiraling flow of the incoming air to circulate around the emplaced filter, along its length, to assure that the entire filter is used for filtration of the air, and not just isolated areas along the front of the filter, which would greatly reduce its efficiency of usage. In addition, the concept of biasing the filter in place, through the use of a wire guide, and a spring biased plate, assure that the filter remains axially arranged longitudinally along the length of the unit housing 2, to assure its uniform functioning for filtration of all of the circulating air, as it passes along the length of the unit, during its usage. In addition, the concept of contouring the air as it passes through the air inlet, so that it enters into the spiraling motion, is essential to the efficient operations of the air filtration unit of this invention. Finally, the use of a silencer within the air intake structure, in order to act as a baffle for damping of sound generated during the pumping of the air and while being filtered, is a preferred benefit to the overall structure and usage of the filtration unit of this invention.

The air inlet chamber with it noise reducer functions as a resonating chamber to reduce the blower noise, without any restriction upon the flow of the air, and without causing any turbulence in the air flow, which may otherwise generate a heat buildup within the unit, during its continuous operations.

This unit, during its functioning, starts to spin or spiral the air as it enters into the unit, and directs it up into the housing, along the complete length of the filter element, to provide for smooth and even filtration of the air, with less back pressure, and without any pressure drop, making the filter element last longer than any of the known units upon the market.

The spin and spiral flow of air through the flow assembly of this invention incorporates fewer parts, with a single cam lever operative lid necessitating fewer adjustment, where the lid can be easily removed, its gasket separated for cleaning, and the filter can be cleaned or replaced, with ease. Seal tab holes are also provided within the cam structure, so it can be locked in place, and provide tamper proof operations for the filtration unit.

Variations or modifications to the subject matter of this invention may occur to those skilled in the art upon review of the invention as described herein, and such variations, within the spirit of this invention, are intended to be encompassed within the scope of any claims to patent protection issuing hereon. The summarization of the invention as provided herein, and its depiction in the drawings, are set forth for illustrative purposes only.

I claim:

1. An air filtration device generating air spin for use for pre filtering air entering an unloading conduit for a storage device for storing granular material comprising a housing, said housing incorporating an air inlet, and an air outlet, said housing having a longitudinal filter element arranged therein, the filter element having a length, wherein air passing into the housing through the air inlet passes through the filter and after filtration passes through the air outlet into the unloading conduit, a baffle being located within the air inlet to provide for lessening of any sound generated during a pumping of the air into the air inlet to pass through the filter, an entrance door connecting with an end of the housing, which when opened, allows for installation or removal of the filter element, and said air inlet being contoured to provide for a spin flow of the air entering into the housing to induce for its circulation around the filter along the length of the filter to attain efficient filtration of the air before the air is applied to convey the granular material from the storage device.

2. The air filtration device of claim 1 wherein said air inlet and air outlet are provided at an end of the housing which is opposite to the end where the entrance door is connected.

3. The air filtration device of claim 2 wherein the door is pivotally connected to the housing to provide for the door to swing open when the filter element is replaced or installed.

4. The air filtration device of claim 2 wherein the air outlet is axially and longitudinally aligned with the filter, while the air inlet is tangentially structurally located relative to the housing to thereby provide for a spin flow of air passing into the housing for filtration purposes.

5. The air filtration device of claim 3 wherein said door comprises a first side and a second side, a pivot pin along the first side, said pivot pin being attached to the housing, and a locking device provided on the second side of said door, for securement of said door to the housing.

6. The air filtration device of claim 5 wherein said locking device comprises a cam lever which when manipulated holds the door in closure against the housing.

7. The air filtration device of claim 6 further comprising a gasket provided between the door and the housing to insure sealing of the housing during usage.

8. The air filtration device of claim 6 further comprising a plate, said plate being spring mounted to an inner portion of the door, said plate being axially aligned with an longitudinal axis of the filter, and said plate provided for biasing against an end of the filter to assure that the spin flow of air entering the housing passes through the filter during a filtration process.

9. The air filtration device of claim 1 wherein the air inlet is contoured as a chute for directing air passing into the housing in a swirling movement around the filter.

10. The air filtration device of claim 1 wherein the baffle is secured within the air inlet to the housing.

11. The air filtration device of claim 10 wherein said baffle comprises a flange provided around an inner perimeter of the air inlet, and a sleeve connecting with and extending downwardly from the flange.

12. The air filtration device of claim 11 wherein the flange has a diameter and the air inlet has a diameter and the diameters are approximately the same.

13. The air filtration device of claim 12 wherein the air inlet is contoured below the baffle.

14. The air filtration device of claim 13 wherein said air inlet is contoured and structured as a chute arranged below the baffle for directing air passing into a swirling pattern around the filter element to achieve filtration over the length of the filter during operation of the filtration device.

15. The air filtration device of claim 14 wherein the air outlet comprises an inner end that extends into the housing and a guide to centrally seat the filter element thereon.

16. The air filtration device of claim 15 further comprising a flange provided at the inner end of the air outlet, and said flange securing against the housing to provide a seal between the air outlet and the housing.

17. An air filtration device comprising a housing, a filter capable of being installed within the housing during use of the filtration device, the filter having a length, an air inlet, an air outlet, a lid provided for access into the housing for installing or removing the filter, a baffle being located within the air inlet to provide for lessening of any sound generated during a pumping of air into the air inlet to pass through the filter, and said air inlet being contoured to induce spin flow of air pumped into the housing in a swirling pattern to assure that air is filtered over the length of the filter during use of the filtration device.

* * * * *

UNITED STATES PATENT AND TRADEMARK OFFICE
CERTIFICATE OF CORRECTION

PATENT NO. : 8,657,898 B2  
APPLICATION NO. : 13/200235  
DATED : February 25, 2014  
INVENTOR(S) : Sisk Page 1 of 1

It is certified that error appears in the above-identified patent and that said Letters Patent is hereby corrected as shown below:

In the Specification

Col. 1 Line 7-9 should read

This non-provisional patent application claims priority to the design patent application having Serial No. 29/373,511, now United States patent No. D652,904, which issued on January 24, 2012.

Signed and Sealed this
Sixth Day of January, 2015

Michelle K. Lee
*Deputy Director of the United States Patent and Trademark Office*